(12) United States Patent
Mourou et al.

(10) Patent No.: US 9,095,994 B2
(45) Date of Patent: Aug. 4, 2015

(54) METHOD FOR APPLYING VARIABLE MAGNETIC PROPERTIES TO A INDUCTION HEATED TOOL FACE AND MANUFACTURING PARTS USING THE TOOL

(75) Inventors: Julien P. Mourou, Bloomfield Hills, MI (US); Urban J. De Souza, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 503 days.

(21) Appl. No.: 13/205,924

(22) Filed: Aug. 9, 2011

(65) Prior Publication Data

US 2013/0040051 A1 Feb. 14, 2013

(51) Int. Cl.
| | |
|---|---|
| H05B 6/02 | (2006.01) |
| H05B 6/24 | (2006.01) |
| B29C 33/06 | (2006.01) |
| B29C 45/73 | (2006.01) |

(52) U.S. Cl.
CPC ............... B29C 33/06 (2013.01); B29C 45/73 (2013.01); *B29C 2045/7368* (2013.01); *B29K 2995/0008* (2013.01)

(58) Field of Classification Search
CPC .... B29C 33/00; B29C 33/02; B29C 33/3828; B29C 33/3842; B29C 33/56; B29C 2045/00; B29C 2045/03; B29C 2045/26; B29C 2045/37; B29C 45/02; B29C 45/37; A47J 27/002
USPC ......... 219/221, 385, 420, 421, 600, 647, 649, 219/655; 264/402, 403, 486, 487; 427/591, 427/135, 133, 128, 132, 130
See application file for complete search history.

(56) References Cited

U.S. PATENT DOCUMENTS

| | | |
|---|---|---|
| 4,044,774 A | 8/1977 | Corbin et al. |
| 4,323,756 A | 4/1982 | Brown et al. |
| 4,411,258 A | 10/1983 | Pujals, Jr. |
| 4,626,999 A | 12/1986 | Bannister |
| 4,633,889 A | 1/1987 | Talalla et al. |
| 4,663,513 A | 5/1987 | Webber |
| 4,724,299 A | 2/1988 | Hammeke |
| 4,803,986 A | 2/1989 | Dufresne et al. |
| 4,915,757 A | 4/1990 | Rando |
| 5,031,618 A | 7/1991 | Mullett |
| 5,041,974 A | 8/1991 | Walker et al. |
| 5,196,015 A | 3/1993 | Neubardt |

(Continued)

FOREIGN PATENT DOCUMENTS

EP 1925421 A1 5/2008

OTHER PUBLICATIONS

Beautiful Performance—Functional Polymers to Improve Design Aesthetics and Reduce Overall Costs, Ticona—Performance Driven Solutions, Mar. 2009, pp. 1-20.

(Continued)

*Primary Examiner* — Michael Wieczorek
(74) *Attorney, Agent, or Firm* — Ingrassia Fisher & Lorenz, P.C.

(57) ABSTRACT

In accordance with an exemplary embodiment, a method for manufacturing a tool comprises applying at least one ferromagnetic material to at least a portion of a tool face of a different material. The method produces a tool face with varying magnetic properties facilitating substantially uniform induction heating of the tool face.

18 Claims, 6 Drawing Sheets

(56) References Cited

U.S. PATENT DOCUMENTS

| | | |
|---|---|---|
| 5,246,745 A | 9/1993 | Baum et al. |
| 5,303,141 A | 4/1994 | Batchelder et al. |
| 5,342,409 A | 8/1994 | Mullett |
| 5,358,513 A | 10/1994 | Powell, III et al. |
| 5,423,877 A | 6/1995 | MacKey |
| 5,474,558 A | 12/1995 | Neubardt |
| 5,501,703 A | 3/1996 | Holsheimer et al. |
| 5,517,420 A | 5/1996 | Kinsman et al. |
| 5,541,721 A | 7/1996 | Scheuer et al. |
| 5,595,670 A | 1/1997 | Mombo-Caristan |
| 5,612,887 A | 3/1997 | Laube et al. |
| 5,642,287 A | 6/1997 | Sotiropoulos et al. |
| 5,643,330 A | 7/1997 | Holsheimer et al. |
| 5,659,479 A | 8/1997 | Duley et al. |
| 5,714,735 A | 2/1998 | Offer |
| 5,729,277 A | 3/1998 | Morrison |
| 5,773,097 A | 6/1998 | Rogari |
| 5,786,023 A | 7/1998 | Maxwell et al. |
| 5,837,960 A | 11/1998 | Lewis et al. |
| 6,046,426 A | 4/2000 | Jeantette et al. |
| 6,122,564 A | 9/2000 | Koch et al. |
| 6,311,099 B1 | 10/2001 | Jasper et al. |
| 6,354,361 B1 * | 3/2002 | Sachs et al. ............ 164/128 |
| 6,396,025 B1 | 5/2002 | Pyritz et al. |
| 6,423,926 B1 | 7/2002 | Kelly |
| 6,459,951 B1 | 10/2002 | Griffith et al. |
| 6,518,541 B1 | 2/2003 | Kelly |
| 7,139,633 B2 | 11/2006 | Mazumder et al. |
| 7,645,416 B2 | 1/2010 | Buehler et al. |
| 7,765,022 B2 * | 7/2010 | Mazumder et al. ........ 700/121 |
| 2004/0020625 A1 | 2/2004 | Mazumder |
| 2006/0118548 A1 * | 6/2006 | Imura ............... 219/634 |
| 2009/0074905 A1 * | 3/2009 | Matsen et al. ........ 425/547 |
| 2009/0239023 A1 * | 9/2009 | Olin et al. ........ 428/64.2 |
| 2010/0018271 A1 * | 1/2010 | Matsen et al. ........ 72/19.1 |

OTHER PUBLICATIONS

Kim, Soohong. Temperature Distributions on Mold Surface by Induction Heating, University of Massachusetts, Amherst, Finite Element Analysis, Spring 2003, pp. 1-4.

Major Solutions for an Electric Automobile, The Ticona Magazine, Ticona—Performance Driven Solutions, Apr. 2010, pp. 10-26.

Tremblay, Gregory E. et al., Investigation of Injection Molding Performance Using Induction Barrel Heating, SABIC Innovative Plastics, pp. 1-6.

Landefeld, Craig F. et al, Inductive Heating of Diffusely Penetrating Linings of Coreless Induction Furnaces, Research Report MR-601/EG-126, Research Laboratories, General Motors Corporation, Warren, Michigan, Aug. 2, 1977, pp. 1-52.

Lalere, Marie-Laure et al. Aerospace: Roctool Presents 3iTECH, a Solution That Responds to the Part Manufacturers Restraints, RocTool—Innovative Molding Technologies, Le Bourget du Lac, Mar. 29, 2010.

Azzopardi, C.P. (Chuck), Senior, New Laser-based, Solid Free Form Fabrication Technology Revolutionizes Die/Mold Building and Restoration, SAE Technical Paper Series, SAE 2001 World Congress, Detroit, Michigan, Mar. 5-8, 2001, pp. 1-7.

Smith, Zan et al., Primer-Switching From Metals to Plastics, Ticona—Performance Driven Solutions, Ticona LLC, Summit N.J., pp. 1-25.

Truesdail, Abeer, New Weatherable Film Technology to Eliminate Painting of Automotive Exteriors, SAE Technical Paper Series, SAE 2001 World Congress, Detroit, Michigan, Mar. 5-8, 2001, pp. 1-7.

State Intellectual Property Office of the Peoples' Republic of China, Office Action in Chinese Patent Application No. 201210281954.5, mailed Jul. 31, 2014.

* cited by examiner

METHOD FOR APPLYING VARIABLE MAGNETIC PROPERTIES TO A INDUCTION HEATED TOOL FACE AND MANUFACTURING PARTS USING THE TOOL

TECHNICAL FIELD

The technical field generally relates to manufacturing tooling for forming parts, and more particularly, to manufacturing tooling by applying variable magnetic properties on the tool face to provide controlled and precise induction heating of the tool when forming parts.

BACKGROUND

Automobile fascias, body side moldings, side panels, etc., are typically produced by an injection molding process followed by painting. The last steps of the painting process commonly require that the painted part be baked for about 30 minutes at, for example, 250 degrees Fahrenheit. This production procedure is proven and functions well; however, there are some drawbacks associated with this process, including the scrap rate due to paint defects, provisions for protection against possible damage during handling and the requirement that reinforcement of the parts be added post-forming as the reinforcing material cannot be applied during the part forming process.

In conventional part forming processes, a tool is heated and material is injected to contact a tool face upon which the part is formed. Differences in tool face temperature impact the quality of the part as well as the ability to keep the material near the glass transition temperature to achieve a class "A" finish and gloss on the part. Differences in tool face temperature also induce internal stresses. Moreover, conventional tooling is not able to have a tool face at a high enough temperature, and uniform in temperature to achieve high gloss parts, use thinner wall stock, increase flow length, reduce weld lines or provide a resin rich surface for parts. Accordingly, parts generally require the separate painting step due to these challenges in part forming.

Accordingly, it is desirable to provide a method for making a tool having a tool face with uniform heating at all temperatures used during part formation processes. Also, it is desirable to provide process for using the tool where reinforcing material may be added during the part forming cycle. Additionally, other desirable features and characteristics of the present invention will become apparent from the subsequent description taken in conjunction with the accompanying drawings and the foregoing technical field and background.

BRIEF SUMMARY

In accordance with an exemplary embodiment, a method for manufacturing a tool comprises applying at least one ferro-magnetic material to at least a portion of a tool face being of a different material.

In accordance with an exemplary embodiment, a method for manufacturing parts via a tool having a tool face with varying magnetic properties begins by induction heating the tool and injecting material into the heated tool. After cooling the tool, the part formed from the material may be removed from the tool.

In accordance with an exemplary embodiment, a system includes a tool having a tool face with at least one ferro-magnetic material applied to at least a portion of the tool face. A heater heats the tool and an injector injects material into the heated tool. A cooling system cools the tool for removal of the finished part.

DESCRIPTION OF THE DRAWINGS

The inventive subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-3 are merely illustrative and may not be drawn to scale.

Figure 1A:
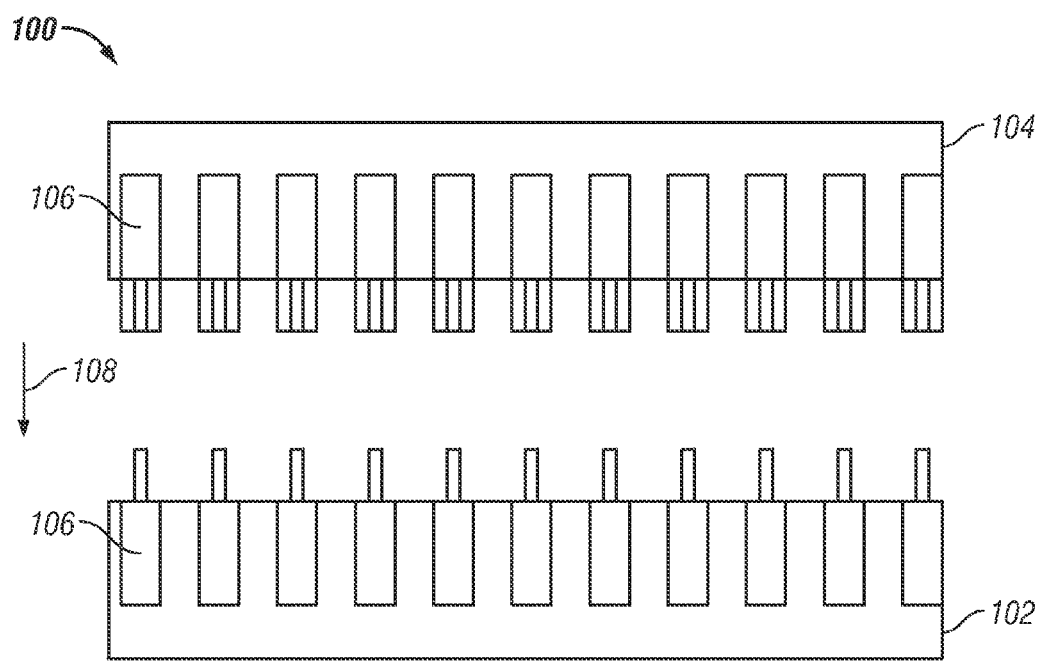
FIGS. 1A and 1B are illustrations of an induction heated injection molding system suitable for use with exemplary embodiments of the present disclosure.
Figure 1B:
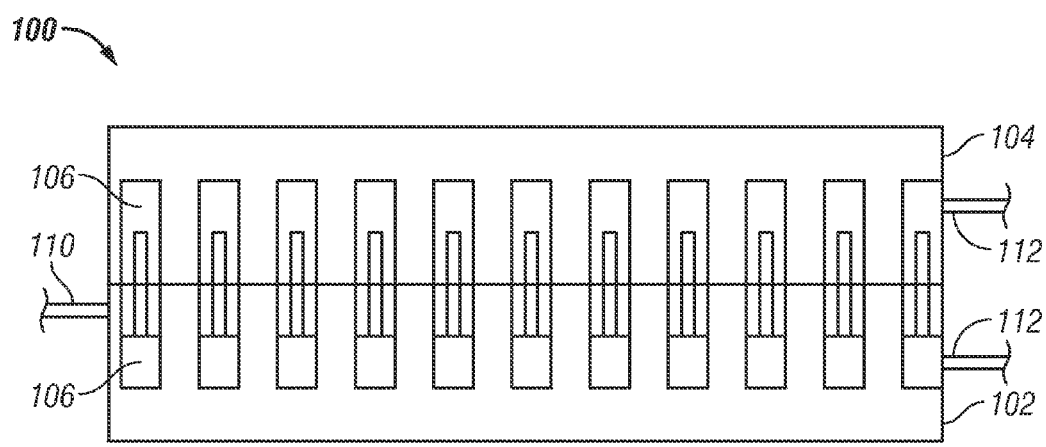

FIGS. 1A and 1B are simplified illustrations of an embodiment of a part forming tool 100 and system according to the present disclosure. While FIGS. 1A and 1B depict various electrical and mechanical connections and couplings in a very simplified manner for ease of description, actual part forming equipment will, of course, utilize additional physical components and devices that are well known in the industry.

In the example of FIG. 1A, a tool 100 includes a lower portion 102 and an upper portion 104. The tool 100 has a plurality of induction heating elements (e.g., coils) 106 positioned about the periphery (or two sides thereof) to provide heating of the tool. In operation, the lower portion 102 and upper portion of the tool are coupled together (see reference arrow 108) and the heating elements are energized (see, FIG. 1B). Once heated to a predetermined temperature (e.g., the glass transition temperature of the material to be used for form a part), one or more injectors 110 inject material into the heated tool 100 to begin part formation. After a time period (which depends upon the part size and material used to form the part), the tool 100 is cooled by injecting a cooling fluid (e.g., water) into cooling ports 112. After cooling to a predetermined temperature, the lower portion 102 and upper portion 104 of the tool 100 may be separated (see, FIG. 1A) and the part removed from the tool 100.

Figure 2:
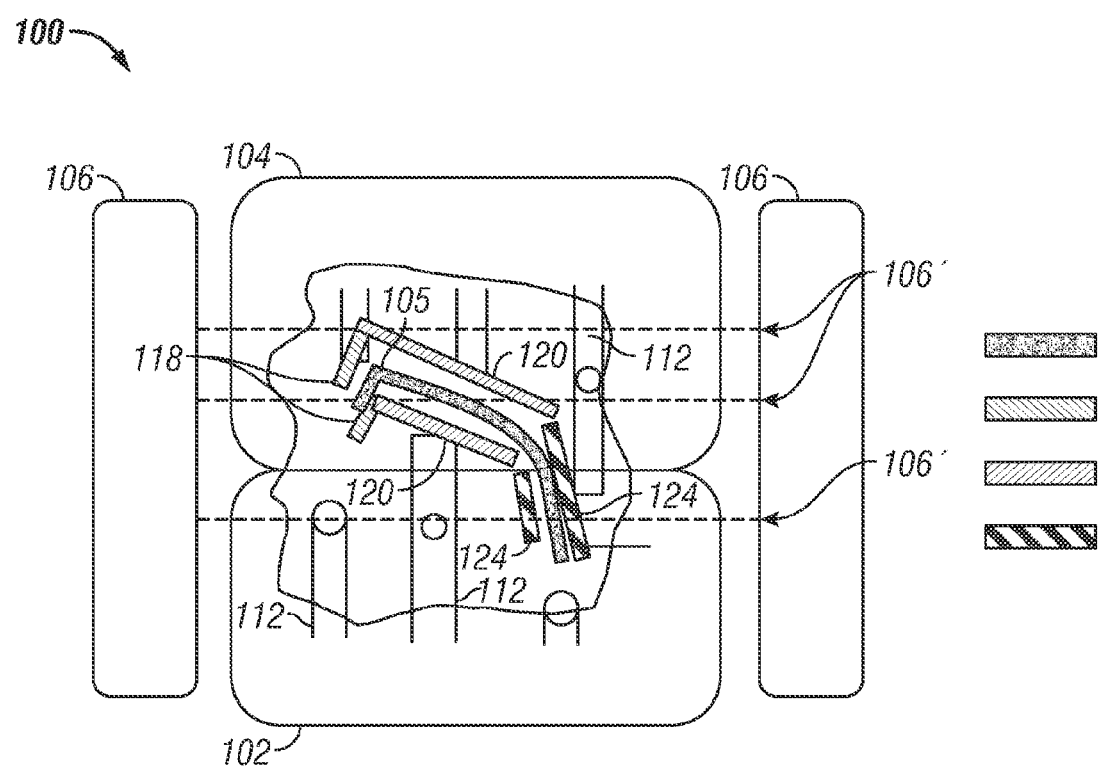
FIG. 2 is a cut-away view of an induction heated injection molding system of FIG. 1B illustrating an example of a part being formed in accordance with exemplary embodiments.

Referring to FIG. 2, a cross-sectional cut-away view of the tool 100 illustrating a part 105 being formed within the lower portion 102 and the upper portion 104 of the tool 100. According to exemplary embodiments, various (three shown) ferro-magnetic materials (or compounds) 118-124 have been deposited on the tool 100 as will be further discussed below. The ferro magnetic materials alter the magnetic properties of the tool 100 and how the tool 100 heats with the induction heating elements 106 apply a field 106' across the tool 100. By controlling the type and amount of the ferro-magnetic materials applied to the tool 100, heating profiles can be adjusted (fine tuned) for the part being formed. In one embodiment, the ferro-magnetic materials comprise steel grades such as P4 (5% Chromium), P5 (2.25% Chromium), or P20 (1.7% Chromium). This affords the advantages of the tool 100 being able to maintain the tool face temperature above the glass transition temperature or crystalline melting temperature during the injection cycle to produce parts with a painted finish look without in-mold films or post processing. Additionally, or parts with thinner wall stock can be created (albeit without the painted finish look). Moreover, reduced energy and manufacturing costs are achieved by the adjusted (or tuned) heating of the tool 100 via the deposition of ferro-magnetic materials, which allows for longer and more uniform pressure (lower injection pressure and clamping requirements), improved flow length, reduced internal stresses, improved replication of mold surface, improved part finish and reduction or elimination of weld lines.

Figure 3A:
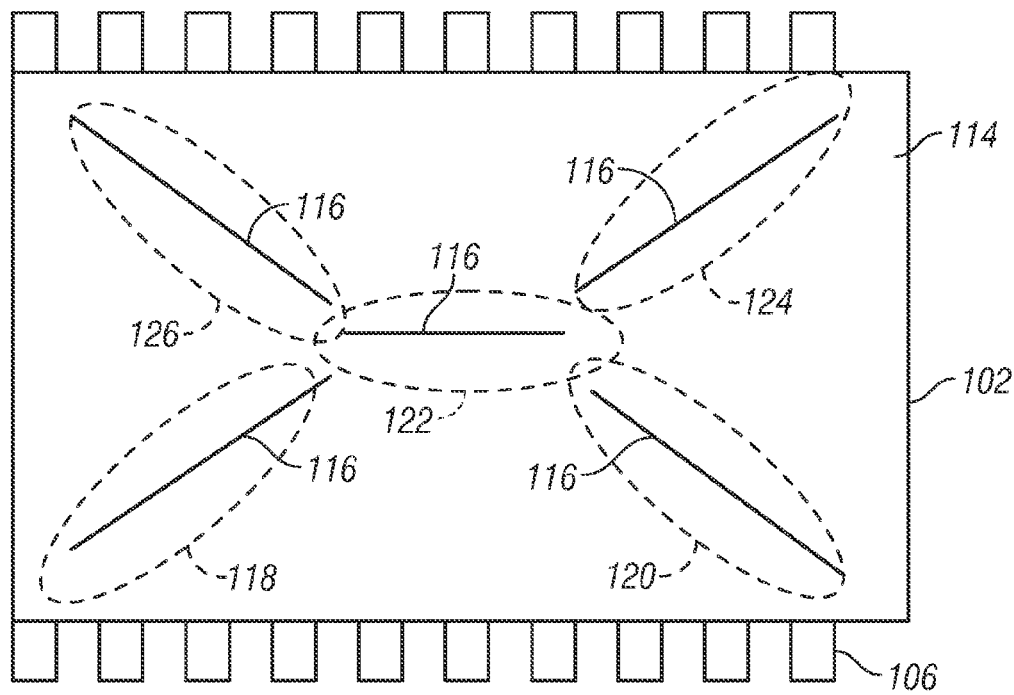
FIG. 3A is a top plan view of a tool face in accordance with exemplary embodiments of the present disclosure.

Referring to FIG. 3A, a top plan view of the lower portion 102 of the tool 100 is shown. In this view, the tool face 114 can be seen to include some reference lines 116 that will define (in part) the shape of the part to be formed by the tool. It will be appreciated that the illustration of FIG. 3A is merely a simplified example, and parts having a much more complex shape may be formed following exemplary embodiments of the disclosure.

According to various embodiments of the disclosure, the magnetic properties of the tool face 114 is modified by the selective application of one or more ferro-magnetic materials that are deposited or bonded to the tool face 114. For example, tool face 114 is shown with portions 118-126 where ferro-magnetic materials may be applied to the tool face 114. Other portions are, of course, possible and in some embodiments include covering all or substantially all of the tool face 114. The composition of the ferro-magnetic materials differs from the type or chemistry of the base metal (e.g., aluminum or steel) of the lower portion 102 and upper portion 104, but need not be the same in each portion 118-126. Rather, the ferro-magnetic material may vary in composition or amount applied depending upon the desired heating characteristic of the tool designer. In some embodiments, the ferro-magnetic material comprises rapidly melted and solidified steel powder supplemented by an amount of silicon or chromium to achieve the desired magnetic properties for induction heating.

Once applied to one or more portions of the tool face the varying magnetic properties (electrical resistivity, permeability, and thermal conductivity) caused by the application of the ferro-magnetic materials changes the heating profile of the tool face 114 in the area(s) 118-126 of the application of the ferro-magnetic materials. For example, once the induction heating elements 106 are activated, the induction field (106' of FIG. 2) may cause more or less rapid heating in the portions having the ferro-magnetic materials. In this way, cool or hot spots in the tool face 114 are eliminated, which facilitates more even and uniform heating of the tool face 114. Depending upon the part being formed and the material used, exemplary embodiments of the tool 100 provide substantially uniform heating (for example, at the glass transition temperature of the material being used), which in turn, produces parts having a class "A" finish on the formed part without the need for painting. Typically, gloss levels exceeding seventy can be achieved since the entire tool face 114 can be held at a more uniform temperature across the tool, without the material setting (or "freezing") on some parts of the tool face 114 before others.

Moreover, the substantially uniform temperature of the tool face 114 facilitates reinforcing the part while it is being formed since it can be determined when the finished side of the part is set (frozen) so that the reinforcing material (e.g., fibers) can be injected into the tool and not be visible through the finished face of the part. The substantially uniform hot tool face can be maintained above the glass transition temperature or crystalline melting temperature during the injection of the part material, which allows reinforcements to be hidden and the final part more integrated.

Figure 3B:
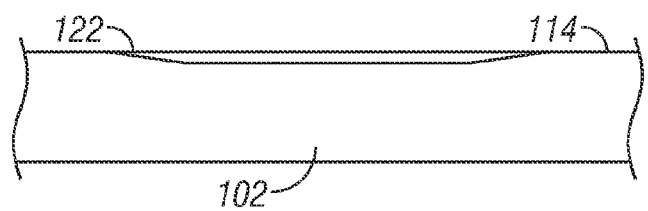
FIGS. 3B and 3C are cross-sectional views of a tool face in accordance with exemplary embodiments of the present disclosure
Figure 3C:
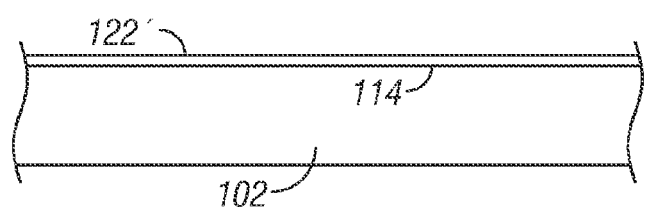

Referring now to FIG. 3B, a cross-sectional view is shown illustrating another embodiment of the lower portion 102 of the tool 100 where a void formed in the tool face 114 (such as by machining or chemical etching) is filled with ferro-magnetic material 122. This allow for variation of the magnetic properties of the tool face 114 without causing an increased tool face profile due to the added material. Alternately, FIG. 3C illustrates the tool face 114 being covered (or substantially covered) with ferro-magnetic material 122', which may comprise one ferro-magnetic material composition or layers of varying ferro-magnetic material compositions to achieve a desired temperature gradient across the tool face 114 when heated. This embodiment may be useful, for example, for a part having different thicknesses or density for which the temperature gradient facilitates even part formation.

Figure 4:
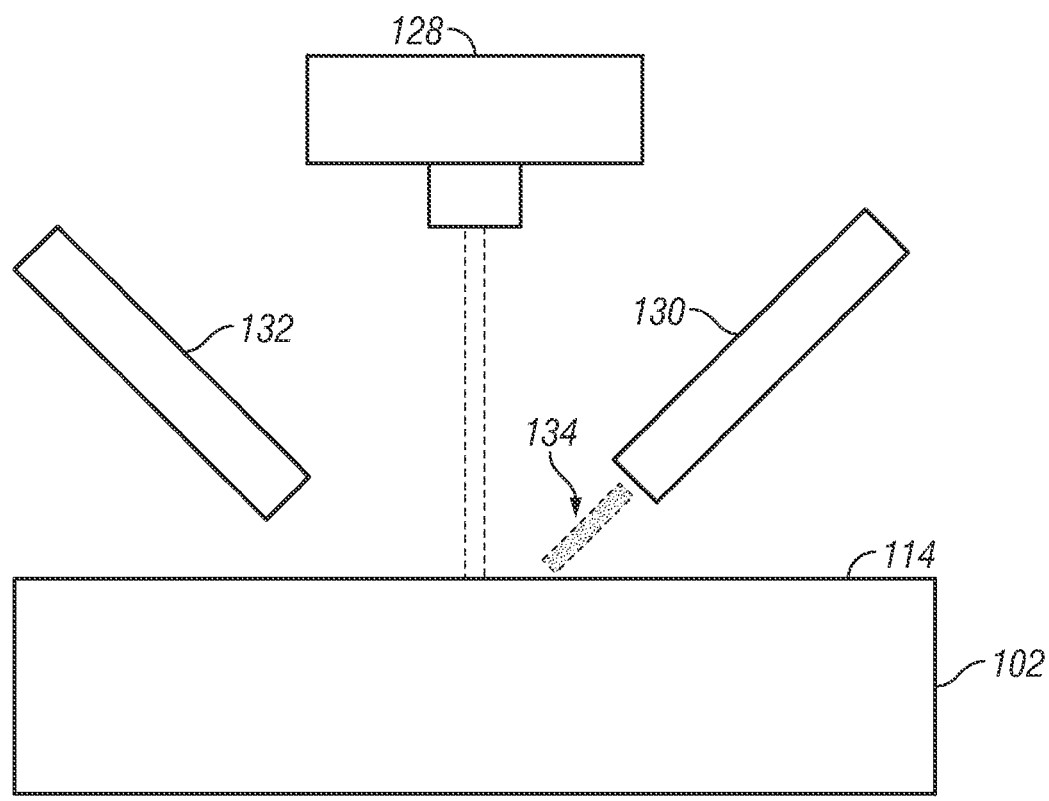
FIG. 4 is an illustration of a deposition process suitable for use with exemplary embodiments of the present disclosure.

FIG. 4 illustrates an exemplary embodiment of applying the ferro-magnetic materials to the tool face 114. In the illustrated embodiment, a laser 128 is employed to fuse ferro-magnetic material powder 134 provides by a supply tube 130. In some embodiments additional supply tubes (one shown) 132 may be positioned to deposit a ferro-magnetic material with a different composition to achieve varying combined chemistry and therefore magnetic properties across the tool face 114. Additionally, other materials can also be deposited to adjust the thermal properties of the tool face 114. Other deposition embodiments include three-dimensional printing techniques, closed loop direct metal deposition, electron beam sputtering, selective laser sintering, fused deposition modeling or any other additive manufacturing process may be used.

Figure 5:
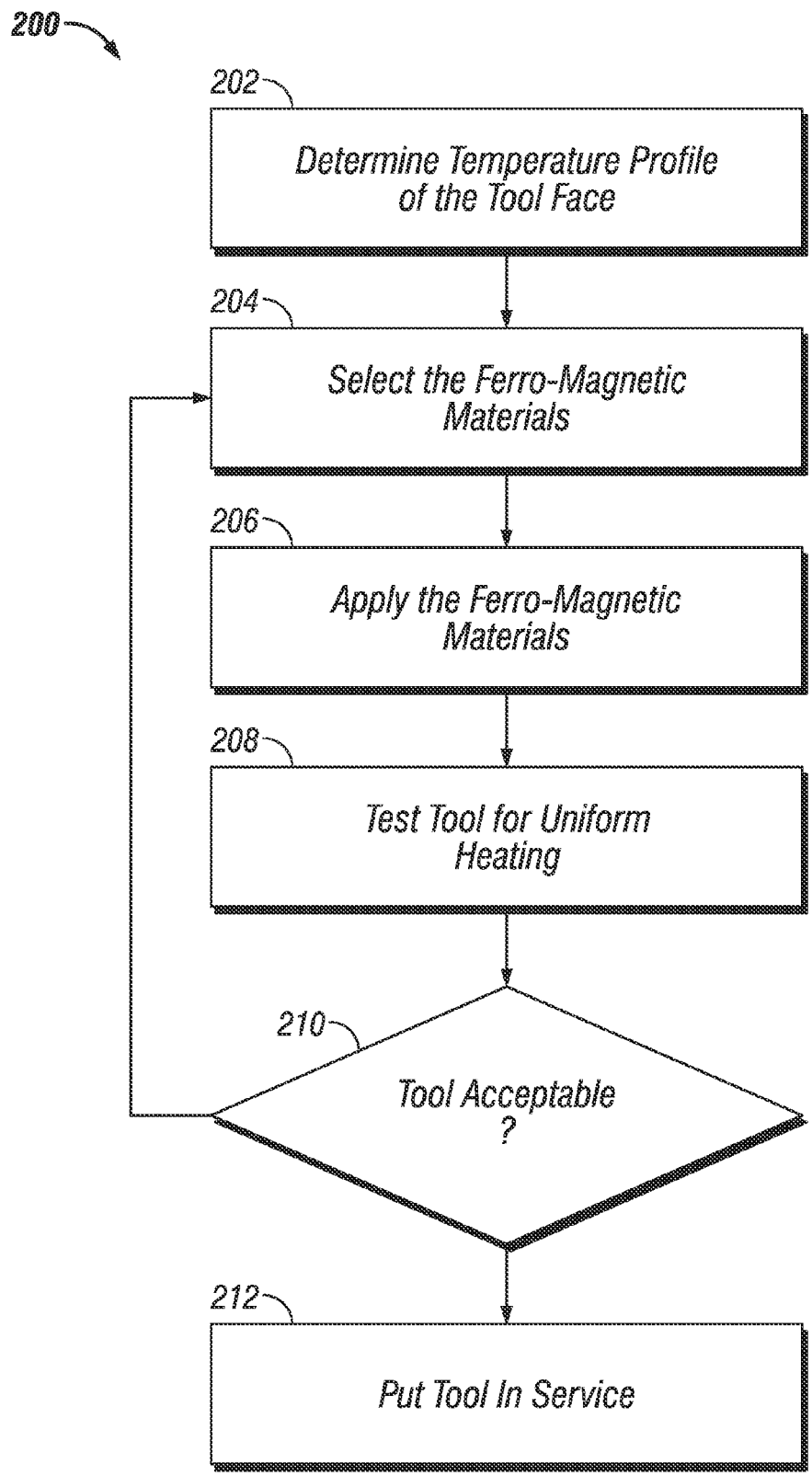
FIG. 5 is a flow diagram for a method for making a tool following the principles of exemplary embodiments of the present disclosure.

Referring now to FIG. 5, a flow diagram useful for determining where and how much ferro-magnetic material with fixed or varying composition should be applied to the tool face 114. The various tasks performed in connection with the method 200 of FIG. 5 may be performed by software, hardware, firmware, or any combination thereof. For illustrative purposes, the following description of the method of FIG. 5 may refer to elements mentioned above in connection with FIGS. 1-4. In practice, portions of the method of FIG. 5 may be performed by different elements of the described system. It should also be appreciated that the method of FIG. 5 may include any number of additional or alternative tasks and that the method of FIG. 5 may be incorporated into a more comprehensive procedure or process having additional functionality not described in detail herein. Moreover, one or more of the tasks shown in FIG. 5 could be omitted from an embodiment of the method of FIG. 5 as long as the intended overall functionality remains intact.

The routine begins in step 202 where the temperature profile of the tool face is determined. In fundamental embodiments, such a determination may be made empirically by using a plurality of thermocouples or other temperature monitoring devices (e.g., infrared thermography) to determine the temperature profile of the tool face. In other embodiments, dimensional analysis of the tool face may be performed via a processor running a program capable of finite element analysis of the tool face to provide an electromagnetic heating model for the tool face. From this information, a tool designer can determine where (what portions) to apply one or more ferro-magnetic materials to the tool face to facilitate substantially uniform heating (e.g., hot spots, cool spots, or other uneven heating areas). Next, the ferro-magnetic material and composition to be used is selected (step 202) depending upon the magnetic properties desired to promote even and uniform heating. The ferro-magnetic material is applied in step 206 using an additive manufacturing process available, such as, for example, three-dimensional printing or laser deposition. In some embodiments, the ferro-magnetic material is applied directly to the tool face. In other embodiments, portions of the tool face may be removed (e.g., machined out) and filled with the ferro-magnetic material. Still other embodiments will cover all (or substantially all) of the tool face with one or more ferro-magnetic materials. Next, in step 208, the tool is tested for uniform heating and production of parts superior to that produced by conventional processes. If the tool is acceptable (decision 210) it is placed into service in step 212. Otherwise, the routine loops back to step 204, where the same or different ferro-magnetic materials may be selected to be applied (step 206) until the tool is acceptable for service (decision 210).

Figure 6:
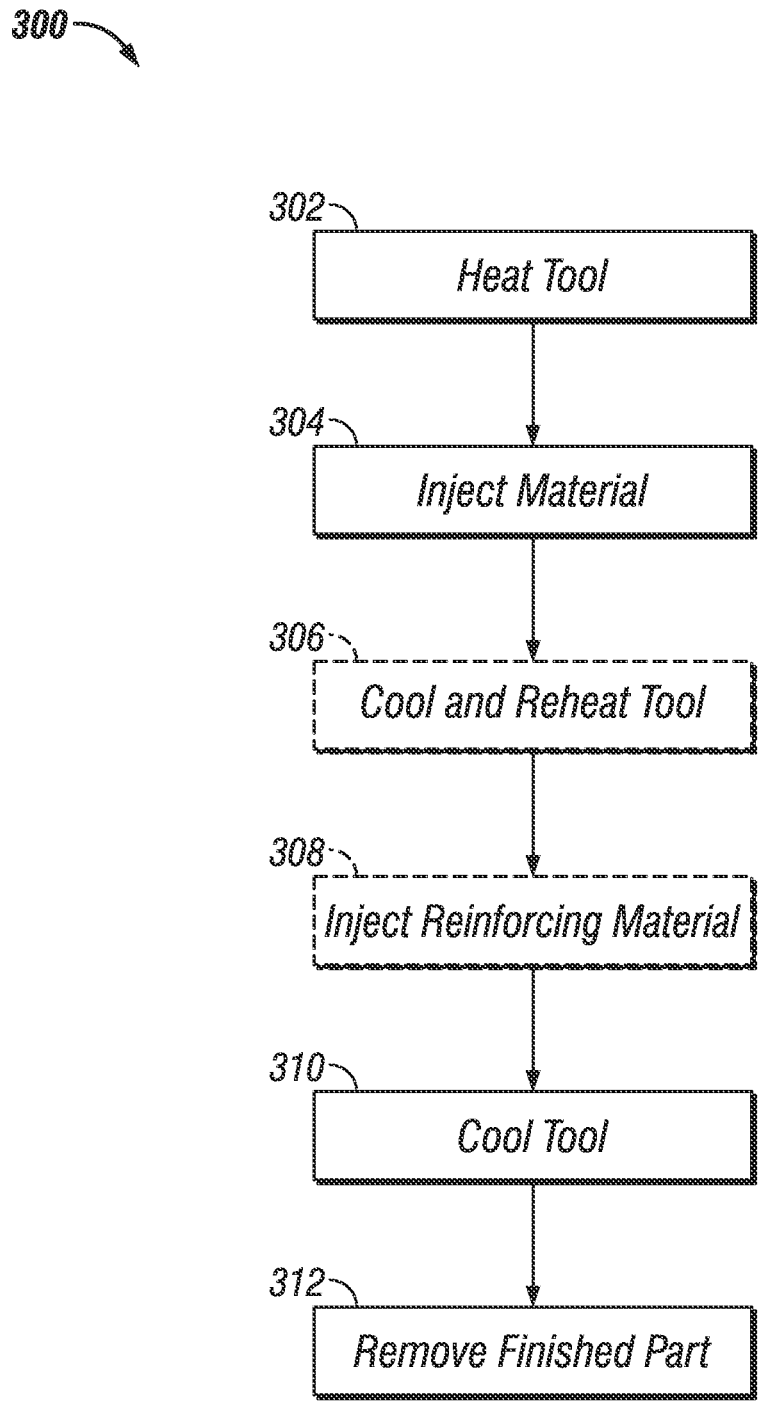
FIG. 6 is a flow diagram for a method of forming a part following the principles of exemplary embodiments of the present disclosure.

Referring now to FIG. 6, a flow diagram for forming a part using the tool of the exemplary embodiments is shown. The various tasks performed in connection with the method 300 of FIG. 6 may be performed by software, hardware, firmware, or any combination thereof. Also, they may employ any thermoforming process, including, but not limited to, press hardened steel, press hardened aluminum, quick plastic forming (QPF) of aluminum and magnesium, warm forming and preform annealing of AL & Magnesium. For illustrative purposes, the following description of the method of FIG. 6 may refer to elements mentioned above in connection with FIGS. 1-4. In practice, portions of the method of FIG. 6 may be performed by different elements of the described system. It should also be appreciated that the method of FIG. 6 may include any number of additional or alternative tasks and that the method of FIG. 6 may be incorporated into a more comprehensive procedure or process having additional functionality not described in detail herein. Moreover, one or more of the tasks shown in FIG. 6 could be omitted from an embodiment of the method of FIG. 6 as long as the intended overall functionality remains intact.

The routine begins in step 302, where the tool is heated such as by activating induction heating elements 106 (see, FIG. 1). Next, step 304 injects the material that will form the part into the tool 100. Optionally, the tool 100 may be cooled and reheated (step 306) in one or more cycles if needed to facilitate part formation or proper curing of the material. Additionally, it is possible with the process afforded by the present disclosure to optionally inject reinforcing material (step 308) during the part formation process. To complete part formation, the tool 100 is cooled (step 310) and the finished part removed (step 312). Generally, the tool 100 would then be again heated (step 302) and the method 300 repeated to continue manufacturing parts.

Accordingly, a method for manufacturing a tool is provided that accords more uniform heating of the tool face due to the application of one or more ferro-magnetic material to one or more portions of the tool face. This affords the advantages of the tool being able to maintain the tool face temperature above the glass transition temperature or crystalline melting temperature during the injection cycle to produce parts with a painted finish look without in-mold films or post processing. Additionally, or parts with thinner wall stock can be created (albeit without the painted finish look). Moreover, reduced energy and manufacturing costs are achieved by the adjusted (or tuned) heating of the tool 100 via the deposition of ferro-magnetic materials, which allows for longer and more uniform pressure (lower injection pressure and clamping requirements), improved flow length, reduced internal stresses, improved replication of mold surface, improved part finish and reduction or elimination of weld lines.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:
applying a first ferro-magnetic material to at least a first portion of a tool face, the first ferro-magnetic material having a first amount of chromium and being a different material than the tool face with different magnetic properties;
applying a second ferro-magnetic material to at least a second portion of the tool face, the second ferro-magnetic material having a second amount of chromium being different than the first amount of chromium and also being a different material than the tool face with different magnetic properties;
whereby, substantially uniform temperature is provided across the tool face during induction heating thereof.

2. The method of claim 1, wherein applying further comprises laser deposition of the first and second ferro-magnetic material to the tool face.

3. The method of claim 1, wherein applying further comprises applying the first and second ferro-magnetic material to the tool face via closed-loop direct metal deposition.

4. The method of claim 1, wherein applying further comprises applying the first and second ferro-magnetic material to the tool face via a three-dimensional printing process.

5. The method of claim 1, wherein applying further comprises applying the first and second ferro-magnetic material to voids formed in the tool face.

6. The method of claim 1, wherein applying further comprises applying the first and second ferro-magnetic material to substantially all of the tool face.

7. The method of claim 1, further comprising processing dimensions of the tool face in a processor to model electromagnetic heating of the tool face via a finite element analysis program.

8. The method of claim 7, further comprising determining via the processor the portions of the tool face to which the first and second ferro-magnetic material will be applied.

9. A method, comprising:
applying, via a three-dimensional printing process, a first and second steel-based ferro-magnetic material to at least a portion of a tool face, the first and second steel-based ferro-magnetic material having different amounts of chromium and being a different material than the tool face with different magnetic properties, and providing substantially uniform temperature across the tool face during induction heating thereof.

10. The method of claim 9, wherein applying further comprises applying the first and second steel-based ferro-magnetic material to voids formed in the tool face.

11. The method of claim 9, wherein applying further comprises applying the first and second steel-based ferro-magnetic material to substantially all of the tool face.

12. The method of claim 9, further comprising processing dimensions of the tool face in a processor to model electromagnetic heating of the tool face via a finite element analysis program.

13. The method of claim 12, further comprising determining via the processor the at least a portion of the tool face to which the first and second steel-based ferro-magnetic material will be applied.

14. The method of claim 9, wherein applying further comprising applying, via the three-dimensional printing process, the first and second steel-based ferro-magnetic material in layers to at least a portion of a tool face.

15. A method, comprising:
determining a temperature profile of a tool face;
determining, via a processor, at least a portion of the tool face to which first and second steel-based ferro-magnetic material will be applied; and
applying, via a three-dimensional printing process, the first and second steel-based ferro-magnetic material to the at least a portion of a tool face, the first and second steel-based ferro-magnetic material having different amounts of chromium and being a different material than the tool face with different magnetic properties, and providing substantially uniform temperature across the tool face during induction heating thereof.

16. The method of claim 15, wherein applying further comprises applying the first and second steel-based ferro-magnetic material to voids formed in the tool face.

17. The method of claim 15, wherein applying further comprises applying the first and second steel-based ferro-magnetic material to substantially all of the tool face.

18. The method of claim 15, wherein applying further comprising applying, via the three-dimensional printing process, the first and second steel-based ferro-magnetic material in layers to the at least a portion of a tool face.

* * * * *